Oct. 8, 1935.  W. H. LLOYD  2,016,833

LIFEGUARD FOR VEHICLES

Filed July 7, 1933  2 Sheets-Sheet 1

INVENTOR.
WILLIAM HENRY LLOYD.
ATTORNEY. Percy Haddan

Oct. 8, 1935.  W. H. LLOYD  2,016,833
LIFEGUARD FOR VEHICLES
Filed July 7, 1933    2 Sheets-Sheet 2
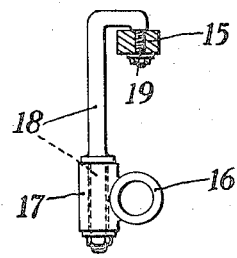
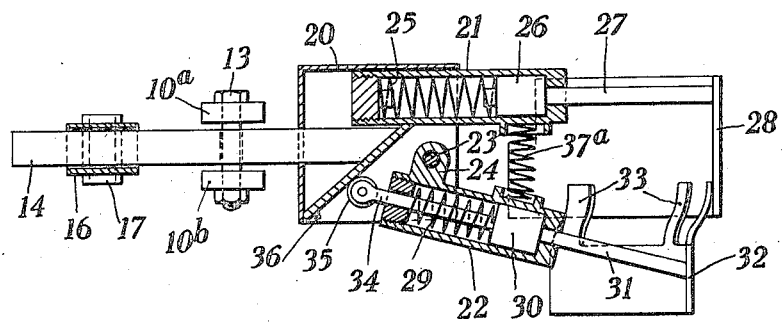
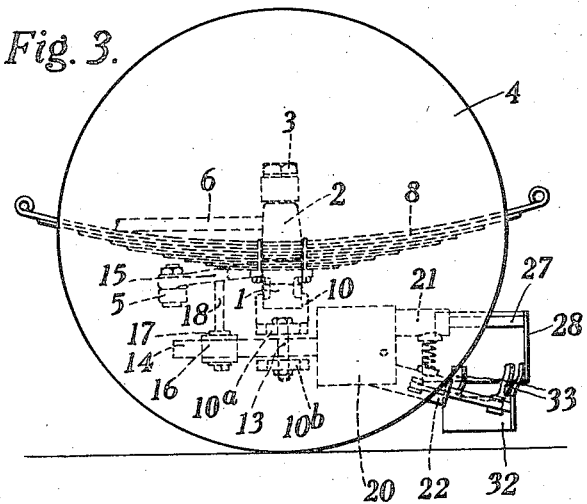
INVENTOR.
WILLIAM HENRY LLOYD.
ATTORNEY.

Patented Oct. 8, 1935

2,016,833

UNITED STATES PATENT OFFICE 2,016,833

LIFEGUARD FOR VEHICLES

William Henry Lloyd, London, England

Application July 7, 1933, Serial No. 679,430
In Great Britain December 1, 1932

4 Claims. (Cl. 293—58)

This invention relates to an improved lifeguard for vehicles and particularly for motor-cars, motor-coaches and other motor driven vehicles.

The object of my invention is to provide a guard principally intended for the front wheels of motor vehicles which will effectually guard persons from being run over by the wheels in all positions which they can assume when being turned for steering purposes.

The improved guard or more properly speaking pair of guards as each front wheel is provided with a guard, follow the movement of the wheels in their turning movement for steering purposes, the guards always remaining in the same position relative to the wheels, irrespective of the angle through which the wheels may be turned.

The guards comprise what may be termed buffers formed of suitably shaped slats each guard preferably comprising two of these buffers, slats or shields both of which can move horizontally against the action of springs while one of said buffer-slats can in addition move vertically as will hereinafter be fully described.

The annexed drawings illustrate an example of construction of the invention; in these drawings—

Figure 1:
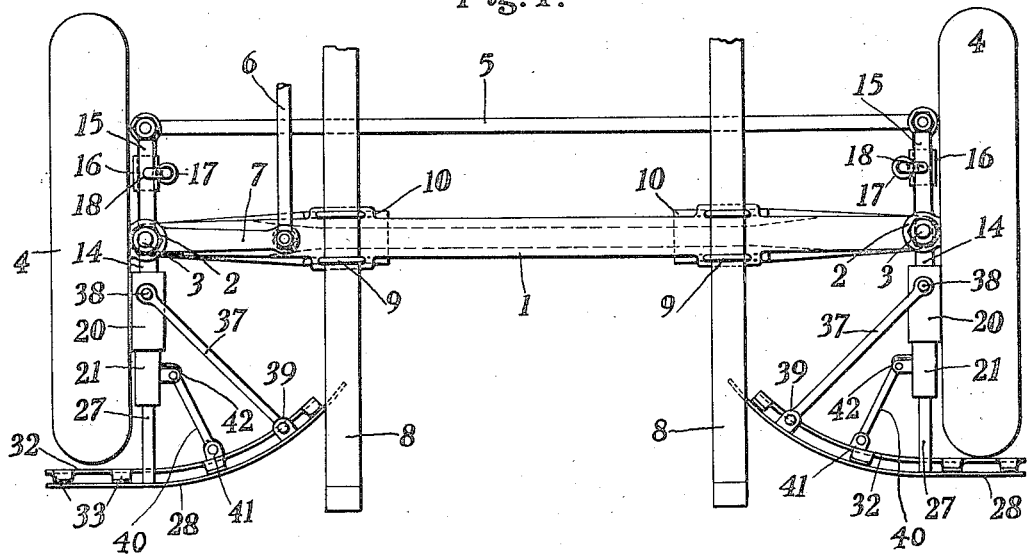
Figure 2:
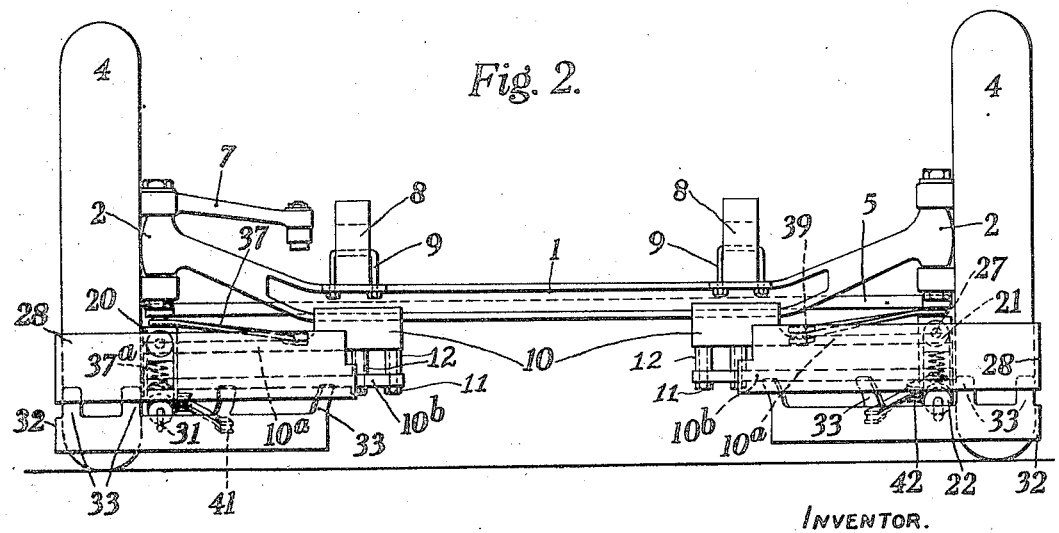

Fig. 1 is a plan view showing the front axle, wheels, springs and steering rod of a motor vehicle of usual construction and shows a life-guard according to my invention provided for each front wheel, Fig. 2 is an elevation of Fig. 1, Fig. 3 is a diagrammatic side view of Fig. 2, Fig. 4 is a sectional elevation on an enlarged scale showing a form of construction of the buffer slats and the mechanism allowing their movement, Fig. 5 illustrates a detail of construction.

The front wheel axle is indicated by the reference character 1 and carries at each end the bearing 2 for the stub-axles 3 round which the wheels 4 can be turned in the usual way for steering purposes. 5 indicates the tie rod and 6, 7 the steering rod and link all of the usual construction.

The springs are shown at 8 connected to the axle 1 by the shackles 9.

Fixed to the axle 1 by bolts or other suitable means are two members or blocks 10 having integral therewith two horizontal arms or brackets 10ª extending in opposite directions from said members 10 as shown in Figs. 1 and 2.

Immediately below each arm 10ª is a second horizontal arm 10ᵇ parallel therewith and fixed at a certain distance from the arm 10ª by means of bolts 11 and distance pieces 12 or by any other suitable means to the blocks 10.

Extending through the opposite ends of each of the pair of arms 10ª, 10ᵇ is a vertical bolt 13 these bolts forming pivots on which the guards can turn.

The two guards are of identical construction excepting that one is arranged for the right hand wheel and the other for the left and I will now describe one of them in detail.

Pivoted upon the bolt 13 and between the ends of the arms 10ª and 10ᵇ is a horizontal bracket or bar 14. The bolt 13 is co-axial with and below the stub axle 3 upon which the wheel is turned for steering purposes. The bar 14 can consequently follow the turning movements of the wheel and for this purpose the rear part of the bar 14 is connected to the link rod 15 of the tierod 5 of the steering mechanism by a connecting member as shown in detail in Fig. 5.

This member comprises a collar 16 slidable upon the bar 14 this collar being connected to a sleeve 17 embracing an elbowed connecting member 18 fixed in a bore 19 of the link rod 15 as shown in Fig. 5 or, otherwise connected thereto.

As shown in Fig. 4, to the front end of the bar 14 is rigidly secured a housing or box 20 open at the front and mounted in said housing is a fixed horizontal cylinder 21 and an inclined cylinder 22 the latter being capable of a vertical pivotal movement about the pivot 23 on which it is pivoted by a lug 24.

Within the cylinder 21 is a compression spring or other cushioning means 25 against which abuts the head 26 of a plunger slidable in the cylinder 21, the rod 27 of which carries the buffer-slat 28 which is suitably curved as shown in Fig. 1.

Within the cylinder 22 is also a compression spring or other cushioning means and the plunger 30 thereof is connected by its rod 31 to a second curved buffer-slat 32 inwardly stepped with respect to the buffer-slat 28 and provided with upwardly extending curved guide arms, or abutments which can slide upon the rear face of the slat 28.

The plunger 30 is provided with a rear arm 34 extending through the rear end of the cylinder 22 and provided at its free end with a roller 35 which can roll on an inclined plane 36 mounted in the housing 20.

Between the cylinders 21 and 22 is a distance spring or other cushioning means designed to normally maintain the cylinder 22 and consequently the buffer-slat 32 in the downward position as shown.

For strengthening purposes I provide a stay 37 one end of which is pivoted to the housing 20 as at 38 and the other end pivoted to the buffer-slat 28 by means of the lug 39; the buffer-slat 32 is connected to the cylinder 22 by means of the stay rod 40 pivoted to the lugs 41 and 42 of the buffer-slat and cylinder respectively.

The several parts herein described have been designed to allow of easily fitting the mechanism to existing cars.

The action is entirely automatic and simple in working.

It can be understood that if a person is struck by the buffer-slats of the guards they will give to a certain extent under the springs 25 and 29 thus taking off some of the force of the blow while they at the same time prevent the wheel 4 from passing over the person who will be pushed along the ground by the buffer-slats.

The fact that the lower slat 32 can ride up is highly important but this action is principally intended only to come into effect if an unyielding or immovable object is met in particular a pavement curb in the case of a skid, when directly the slat 32 strikes the curb it will rise, due to the upward pivotal movement of the cylinder 22 about the pivot 23 caused by the impact, during which pivotal movement the abutments of slat 32 will ride against the rear face of slat 28 and the roller 35 will roll on the inclined plane 36.

By this rising movement the slat 32 will pass over the curb without being broken so that the guard will operate as described if the wheels mount the pavement and a person on the pavement should be struck.

What I claim as my invention and desire to secure by Letters Patent of the United States is:—

1. A lifeguard for a directional wheel of a motor road vehicle comprising two buffer plates situated in front of said wheel one of which plates is uppermost and slightly forward of the other, a fixed horizontal cylinder, a spring in said cylinder, a plunger connected to the upper one of said buffer plates slidable in said fixed cylinder against the action of said spring, a pivoted inclined cylinder, a spring in said inclined cylinder, a plunger connected to the lower one of said buffer plates slidable in said inclined cylinder against the action of said spring therein, a housing containing said cylinders, a pivoted bracket supporting said housing and means whereby said bracket and thereby said housing and said buffer plates can follow the turning movement given the wheel for steering purposes.

2. A lifeguard according to claim 1 wherein the plunger of the pivoted cylinder is provided with an arm extending through the rear end of the cylinder and provided at its free end with a roller adapted to roll on an inclined plane mounted in the housing the said pivoted cylinder being normally maintained in its fully inclined position by a distance spring or the like substantially as described.

3. Lifeguard mechanism for the front steering wheels of a motor road vehicle comprising two horizontal brackets adapted to be fixed to the front axle of the vehicle, a vertical axle carried by each bracket, a horizontal bar pivoted on each vertical axle, an upper and a lower buffer plate, a housing mounted on each of said horizontal bars, means carried by said housings allowing rearward movement of said upper buffer plates and rearward and upward movement of said lower buffer plates on meeting an obstacle, means within said housing cushioning said movements, and means operated through the steering mechanism of the car whereby the said horizontal bars and thereby the respective buffer plates follow the turning movements of the steering wheels.

4. Lifeguards for the front steering wheels of a motor car comprising two horizontal brackets, a wheel guard for each front wheel, means for fixing said brackets to the front axle of the motor car, a vertical axle carried by each of said brackets, these axles being located beneath and in axial alignment with the axes of the pivot pins round which the wheels are turnable for steering purposes, a horizontal bar pivoted on each of said vertical axles, means connecting said wheel guards to the respective horizontal bars and means operated by the steering mechanism of the car whereby the bars and thereby the guards follow the said turning movements of the wheels, no extra weight being placed on the steering mechanism of the car.

WILLIAM HENRY LLOYD.